United States Patent Office 3,698,861
Patented Oct. 17, 1972

3,698,861
HYDROLYSIS OF ALUMINUM ALCOHOLATES
Peter Pascoe, Moers, Friedrich Josten, Rheinkamp-Utfort, Wilhelm Haferkamp, Moers, and Willi Lucker, Homberg, Germany, assignors to Deutsche Texaco Aktiengesellschaft, Hamburg, Germany
No Drawing. Filed Dec. 29, 1969, Ser. No. 888,830
Claims priority, application Germany, Jan. 22, 1969, P 19 03 066.1
Int. Cl. C01f 7/36
U.S. Cl. 23—143    6 Claims

ABSTRACT OF THE DISCLOSURE

Aluminum alcoholates especially those containing aliphatic hydrocarbon radicals of at least 4 carbon atoms are hydrolyzed in the presence of a solvent such as benzene using 3–4 moles of water per mole of alcoholate at a temperature below 80° C.

---

This invention relates to the hydrolysis of aluminum alcoholates. More particulraly, it is concerned with the hydrolysis of aluminum alcoholates not only to obtain almost theoretical yields of the corresponding alcohols but in addition to obtain aluminum hydroxide in a form having good fluidity, low apparent density and high surface area.

The hydrolysis of aluminum alcoholates is known. Aluminum alcoholates particularly those containing aliphatic straight chain hydrocarbon radicals of more than 4 carbon atoms prepared for example by the Ziegler reaction as in German Pat. No. 1,014,008 can be hydrolyzed to form the corresponding alcohols with aluminum hydroxide being formed as a by-product. According to German Pat. No. 1,191,355, one method for the hydrolysis of an alcoholate comprises heating the alcoholate to 80–90° C. and adding the heated alcoholate, within a period of 30 seconds, to boiling water.

An improved method for the hydrolysis of aluminum alcoholates is disclosed in German Pat. No. 1,230,410. According to this patent, the earlier process can be improved by preheating the aluminum alcoholate to 150–180° C. and carrying out the hydrolysis using butanol-saturated water. However, these prior art methods are unsatisfactory in that the preheated aluminum alcoholate must be added, in less than 30 seconds, to a large excess such as 50–60 mols of boiling water. In addition, the by-product aluminum hydroxide has a low surface area of about 180–200 m.$^2$/g., a high apparent density such as 600–800 g./l. and has poor fluidity. Because of these properties, the aluminum hydroxides have limited possibilities for use as for example, catalysts, catalyst supports or adsorption agents.

It has now been found that yields of up to 99% of theory of alcohols and aluminum hydroxide having good fluidity, a surface area of at least about 400 m.$^2$/g. and an apparent density of about 150–180 g./l. can be obtained if the hydrolysis of the aluminum alcoholate is carried out in a solvent in conjunction with 3–4 mols of water based on the aluminum content of the alcoholate at a temperature below 80° C. and preferably below 60° C. Subsequently, the entire reaction product is separated by extraction with a suitable solvent into the alcohol and the hydroxide. The solvent for the alcoholate and for the extraction is chosen so that its boiling range will not present separation difficulties as for example when the alcohol is being separated from the solvent by distillation. The boiling range of the product alcohol has some significance in the selection of the solvent. In general, aromatic hydrocarbons and methylene dichloride have been found satisfactory. Dimethyl sulfoxide has also been found satisfactory as a solvent although in some cases, its boiling range may cause separation difficulties. The hydrolysis of the aluminum alcoholate requires 3 moles of water per gram atom of aluminum. To permit the reaction to go to completion, a slight excess of water up to about 1 mole is preferred.

Advantageously, the hydrolysis of the aluminum alcoholate is carried out in apparatus which can provide sufficient agitation to permit the reactants to come into intimate contact and permit the reaction to go to completion. In small scale experiments apparatus providing high speed agitation may be used but when the hydrolysis is carried out on a larger scale, kneading-masticating type apparatus is preferred.

The hydrolysis is carried out at the boundary layer which forms between the hydrolysis products and the solvents and proceeds in solvents such as benzene so slowly that the reaction mixture is only slightly warmed. It is for this reason that the precipitated aluminum hydroxide has desirable properties. Since the surface area and the apparent density of the aluminum hydroxide depend on the reaction temperature in that high temperatures proposed by the prior art produce hydroxides of high apparent densities and low surface areas, it is a feature of our invention that the hydrolysis is carried out at a low temperature such as below 80° C. and preferably below 60° C.

It has also been found that the greater the amount of excess water present during the hydrolysis reaction, the greater its undesirable effect on the aging and other characteristics of the product aluminum hydroxide. It is therefore another feature of our invention that a very small excess of water is present during the hydrolysis reaction.

Solvent extraction of the hydrolysis reaction product permits a simple and complete recovery of the alcohol and hydroxide formed. Since the extraction is carried out at low temperatures, solvent losses are low. In addition the problem of the aging of the hydroxide is minimized. In the extraction, a solvent-alcohol mixture is formed which is easily separated by distillation to yield a substantially pure alcohol. The aluminum hydroxide, after a short drying period at about 110° C., has good fluidity, an apparent density of about 160–180 g./l. and a surface area of about 400 m.$^2$/g. Solvent recovered from the distillation of the solvent-alcohol mixture and any solvent recovered from the drying of the aluminum hydroxide may be recycled.

The following examples are presented for illustrative purposes only and are not to be considered as limitations on the invention.

EXAMPLE I 100 kilograms of aluminum decylate having an aluminum content of 5.4% was disolved in 100 kilograms of benzene, warmed to 70° C. and then added to 26 kilograms (corresponding to 7.2 moles based on theoretical aluminum) of distilled water. The solution was stirred until a uniformly voluminous pulp was obtained which, by treatment with a rapid stirrer was converted to a gel-like consistency. The gel was then extracted for about 4 hours with benzene. The resulting benzene-decanol mixture was separated by distillation to produce 92.1 kilograms of decanol corresponding to 96.8% theory. The aluminum hydroxide had a surface area of only 280 m.$^2$/g. and an apparent density of 450 grams/liter both of which are unsatisfactory.

EXAMPLE II

In this example 100 kilograms of the same alcoholate used in Example I was dissolved in 100 kilograms of benzene, warmed to 40° C. and added to 14 kilograms (corresponding to 3.9 moles based on theoretical aluminum) of distilled water. The mixture was stirred until, after temporary solidification, it was changed into a thick pulp which was then worked with a rapid stirrer until it attained a gel-like consistency.

The gel was then extracted as in Example I with benzene and there remained a pure aluminum hydroxide which was dried at 110° C. This product had good fluidity, an apparent density of 180 grams/liter and a surface area of 400 m.$^2$/g. Distillation of the bendene-decanol mixture yielded substantially pure decanol in an amount corresponding to 98.6% theory.

Examples I and II show the importance of carrying out the hydrolysis of the alcoholate using a very slight excess of water. In Example I the excess was more than 4 moles whereas in Example II it was less than 1 mole.

EXAMPLE III 100 kilograms of an aluminum alcoholate having an average molecular weight of 385 and an aluminum content of 4.92 weight percent was dissolved in 100 kilograms of methylene dichloride, warmed to 43° C. and mixed with 12 kilograms of water corresponding to 3.8 moles based on the aluminum content. The mixture was stirred as in the preceding examples. After extraction of the gel with methylene dichloride, there remained substantially pure aluminum hydroxide which on drying at 110° C. showed a surface area of 370 m.$^2$/g. and an apparent density of 165 grams/liter. The methylene dichloride-alcohol mixture was separated by distillation and yielded 94 kilograms of an alcohol of average molecular weight 190 corresponding to a yield of 98.2% of theory.

We claim:

1. A process for the production of alcohols and aluminum hydroxide which comprises dissolving an aluminum alcoholate in an organic solvent selected from the group consisting of aromatic hydrocarbons and methylene dicholoride, mixing the solution with a hydrolyzing agent consisting essentially of water in an amount between 3 and 4 mols of water per mol of aluminum alcoholate based on the aluminum content of the alcoholate at a temperature below 80° C. under agitation to form a gel, extracting the gel with aditional solvent, recovering aluminum hydroxide from the resulting solution and separating the resulting solution into alcohol and solvent.

2. The process of claim 1 in which the solvent is benzene.

3. The process of claim 1 in which the solvent is methylene dichloride.

4. The process of claim 1 in which the reaction temperature is below 60° C.

5. The process of claim 1 in which the alcoholate contains aliphatic straight chain hydrocarbon radicals of more than 4 carbon atoms.

6. The process of claim 1 in which the alcoholate contains aliphatic straight chain hydrocarbon radicals of 4–10 carbon atoms.

References Cited

UNITED STATES PATENTS

| 3,419,352 | 12/1968 | Acciarri | 23—143 |
| 3,042,696 | 7/1962 | Aldridge | 23—143 UX |
| 2,805,920 | 9/1957 | Richardson | 23—143 |
| 2,889,268 | 6/1959 | Dinwiddie et al. | 23—143 X |
| 3,394,990 | 7/1968 | Weingaertner et al. | 23—143 |
| 2,970,892 | 2/1961 | Kirshenbaum et al. | 23—143 |

FOREIGN PATENTS

| 667,145 | 2/1952 | Great Britain | 23—143 |

HERBERT T. CARTER, Primary Examiner

U.S. Cl. X.R.

260—632